United States Patent [19]

Yopp

[11] Patent Number: 4,907,452
[45] Date of Patent: Mar. 13, 1990

[54] SYSTEM FOR DETECTING ROTATIONAL IMBALANCE OF VEHICLE ROADWHEELS

[75] Inventor: W. Trent Yopp, Canton, Mich.

[73] Assignee: Ford Motor Company, Dearborn, Mich.

[21] Appl. No.: 253,531

[22] Filed: Oct. 5, 1988

[51] Int. Cl.⁴ ............................................. G01M 1/28
[52] U.S. Cl. ................................... 73/457; 340/438
[58] Field of Search .................. 73/457; 340/438, 440

[56] References Cited

U.S. PATENT DOCUMENTS

| | | | |
|---|---|---|---|
| 2,720,638 | 10/1955 | Ritch | 73/457 |
| 3,438,646 | 4/1969 | Hannapel | 340/438 |
| 3,526,873 | 9/1970 | Burt | 73/457 |
| 3,744,321 | 7/1973 | Hauge | 73/457 |
| 4,408,673 | 10/1983 | Leiber | 180/141 |
| 4,458,535 | 7/1984 | Juergens | 340/438 |
| 4,463,936 | 8/1984 | Shinbori et al. | 180/141 |
| 4,470,260 | 9/1984 | Miller et al. | 180/132 |
| 4,719,445 | 1/1988 | Fremd | 340/438 |

*Primary Examiner*—John Chapman
*Attorney, Agent, or Firm*—Jerome R. Drouillard; Roger L. May

[57] ABSTRACT

A system for detecting dynamic rotational imbalance of vehicle roadwheels includes a force measurement sensor for sensing the force required to steer the roadwheel and further includes a device for generating a force signal corresponding to the sensed force and a processor responsive to the force signal for determining the dynamic rotational balance condition of the roadwheel.

12 Claims, 2 Drawing Sheets

SYSTEM FOR DETECTING ROTATIONAL IMBALANCE OF VEHICLE ROADWHEELS

BACKGROUND OF THE INVENTION

This invention relates to a vehicular system for detecting rotational imbalance of the roadwheels of a vehicle.

DISCLOSURE INFORMATION

A system according to the present invention senses steering force in order to calculate the dynamic rotational imbalance of steerable roadwheels. As used herein, the term "steerable roadwheel" means not only the illustrated arrangements in which the rotational position of the wheel about its kingpin, or steering, axis is maintained by means of a steering gear, but is also intended to mean any wheel in which the rotation of the wheel about its kingpin axis is controlled by means of a linkage exerting a force which may be measured by a transducer shown herein. Accordingly, a system according to the present invention could be used with the rear roadwheels of a front-steering vehicle, which are not thought of traditionally as being "steerable".

U.S. Pat. No. 4,463,936 discloses a system in which steering pressure is measured so as to indicate a vehicle operating condition wherein the leaves of a multileaf suspension spring will be clamped so as to change the damping characteristics of the suspension. U.S. Pat. No. 4,470,260 discloses a system in which hydraulic steering pressure is sensed and used as a control variable in a system which controls the kickback of an open center, load sensing hydraulic steering apparatus. U.S. Pat. No. 4,408,673 discloses yet another system in which steering force is measured so as to provide a signal for increasing power steering assist offered to the vehicle's operator. None of the aforementioned patents discloses a system in which steering force is measured and employed in a system for determining the rotational imbalance of steered wheels.

It is an object of the present invention to provide a system which dynamically detects rotational imbalance of vehicle roadwheels so that corrective measures may be taken before the dynamic imbalance becomes bothersome to the vehicle driver.

It is an advantage of the present invention that a system according to this invention may be employed not only with hydraulically powered steering gears but also with either electrically or manually operated steering mechanisms.

It is yet another advantage of a system according to the present invention that this invention may be employed for determining the absolute magnitude of a weight imbalance affecting a steered roadwheel.

Other objects, features and advantages of the present invention will become apparent to the reader of this specification.

SUMMARY OF THE INVENTION

A system for detecting dynamic rotational imbalance of a steerable roadwheel of a vehicle includes force measurement means for sensing the force required to steer the roadwheel, with the force measurement means further comprising means for generating a force signal corresponding to the sensed steering force, and processor means responsive to the steering force signal for determining the dynamic rotational balance condition of the roadwheel. The processor means may comprise means for resolving the steering force signal into a base component corresponding to steering force normally required to steer the vehicle and a variable component attributable to dynamic rotational imbalance of the roadwheel. The means for resolving the force signal may comprise a bandpass filter. The processor means may further comprise counter means for comparing the frequencies of the velocity signal and the variable component of the force signal, so that the force signal may be rejected by the processor as a spurious signal in the event that the frequencies are not within a common frequency tolerance band.

A system according to the present invention may be used for measuring the absolute dynamic rotational imbalance of a steerable roadwheel if a signal corresponding to the forward velocity of the vehicle is fed back to the processor means so that the processor means is able to perform a calculation which is responsive to vehicle velocity as well as to the sensed steering force. It is possible to determine the absolute magnitude of roadwheel imbalance by using vehicle speed because the amplitude of the steering force signal which is attributable to dynamic rotational imbalance of the roadwheel is a function of the speed of the vehicle and the magnitude of the imbalance.

According to the present invention, a method for detecting dynamic imbalance of a steered roadwheel vehicle comprises: (i) sensing the force require to steer the roadwheel; (ii) generating a force signal having a magnitude corresponding to the sensed force; (iii) resolving the force signal into a base component attributable to steering force normally required to steer the vehicle and a variable component attributable to dynamic rotational imbalance of the roadwheel; (iv) comparing the magnitude of the variable force component to a threshold value; and (iv) providing an imbalance signal in the event that the variable force component exceeds the threshold value.

DESCRIPTION OF THE PREFERRED EMBODIMENTS

Figure 1:
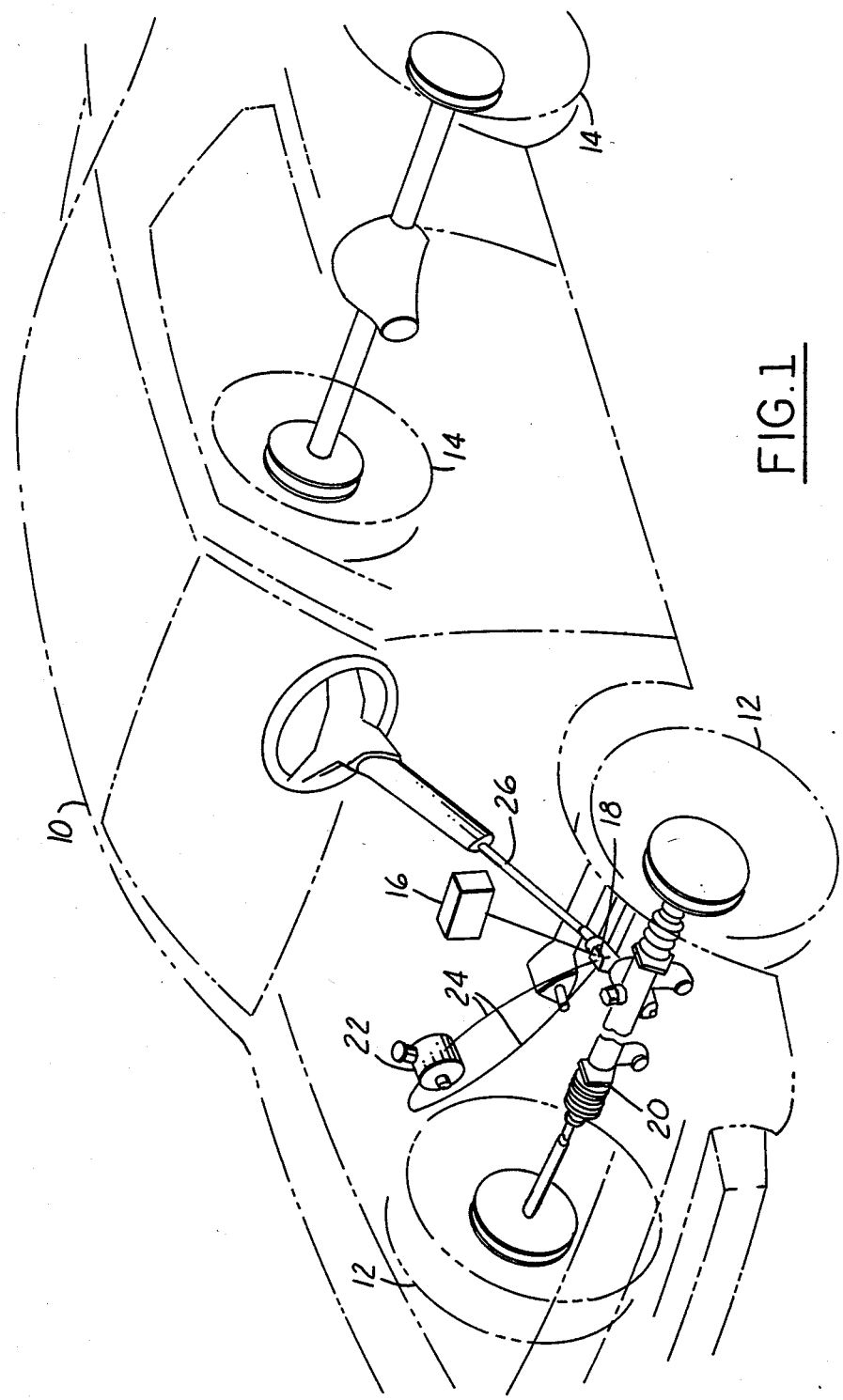
FIG. 1 is a perspective view of a motor vehicle incorporating a system according to the present invention. This Figure shows some of the components of a system embodying the present invention.

FIG. 1 shows a vehicle equipped with a system according to the present invention. Vehicle 10 has front steerable roadwheels 12 and rear roadwheels 14. The direction of the front roadwheels is controlled by the driver via steering shaft 26, which is coupled to steering gear 20, and which in turn controls the steering angle of front wheels 12. Steering gear 20 is of the power type, having steering pump 22, which is driven by the engine of the vehicle and coupled to the steering gear by means of hydraulic hoses or lines 24. Hydraulic pressure sensor 18 is employed for the purpose of measuring the hydraulic pressure maintained by steering pump 22 and hydraulic pressure hoses 24. This pressure is directly relatable to the amount of steering force, $F_S$, required to keep the roadwheels at any steering angle selected by the driver. Hydraulic pressure sensor 18 is operatively connected with microprocessor controller 16 so that steering pressure information is provided by the pressure sensor to the microprocessor controller. The information from hydraulic pressure sensor 18 is translated by microprocessor controller 16 into steering force.

The configuration of hydraulic pressure sensor 18 could comprise any one of several known configurations operating according to a number of principles such as a piezoelectric sensor in which a crystal generates an electrical charge proportional to the pressure exerted on the crystal, which is typically quartz. Those skilled in the art will appreciate in view of this disclosure that other types of pressure sensors such as those utilizing strain gages or electromagnetic principles, or variable capacitance diaphragm devices could be used. A discussion of such sensors is found in *International Combustion Engines*. International Textbook Co., 1968, pages 147-153.

Figure 2:
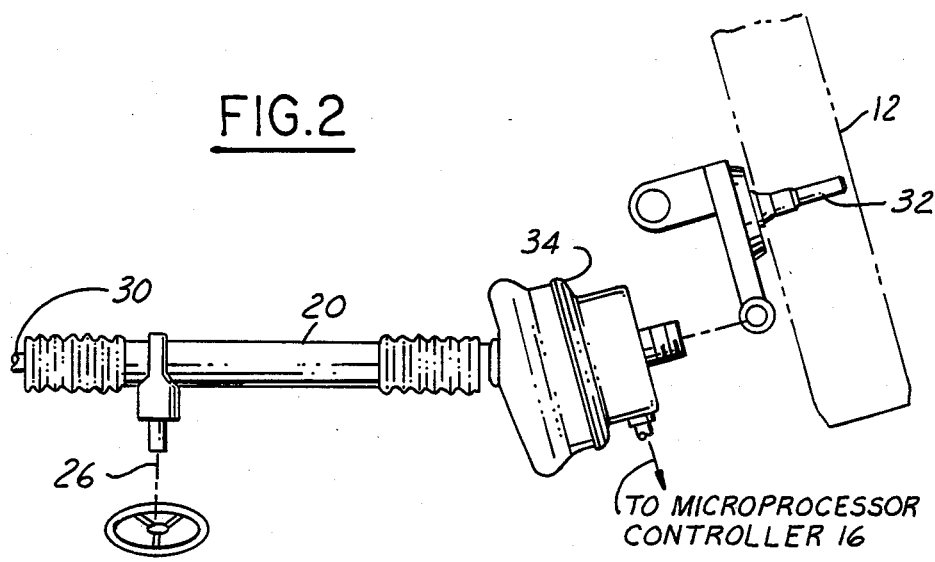
FIG. 2 is a schematic representation of a steering rack, spindle and roadwheel according to one embodiment of the present invention.
Figure 3:
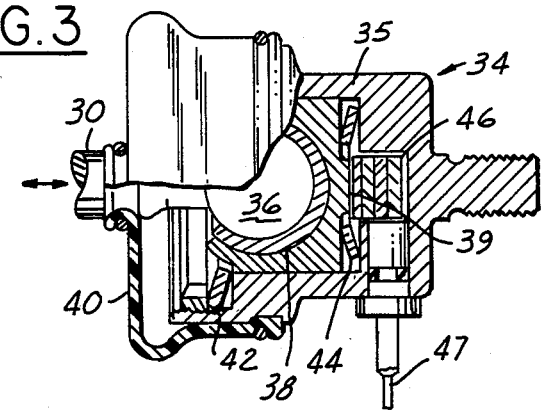
FIG. 3 is a partially schematic representation of a knuckle and force sensor assembly according to the embodiment of the present invention shown in FIG. 2. As used herein, the terms "transducer" and "sensor" are interchangeable. Both terms refer to a device for measuring physical or electronic phenomena.

FIGS. 2 and 3 illustrate a second embodiment of the present invention in which steering force is detected by means of a piezoelectric force transducer. This embodiment is useful for practicing the present invention with not only hydraulically assisted steering systems, but also with electrically powered or even manually operated steering systems because steering force is not measured directly by an element interposed in the roadwheel's attaching linkage. As shown in FIG. 2, steering gear 20, having rack 30 reciprocably mounted therein, has a knuckle and force sensor assembly, 34, mounted at either end. For the sake of brevity, only the passenger's side knuckle and force sensor assembly is shown, it being understood that this system is applied in the same manner to multiple steerable roadwheels.

Knuckle and force sensor assembly 34 is connected by means of conventional linkage to spindle 32, having roadwheel 12 journaled thereto. Spindle 32 conventionally allows roadwheel 12 to be steered about the spindle's kingpin axis. Details of the knuckle and force sensor assembly are shown in FIG. 3. Steering rack 30 has a ball, 36, formed on either end. Ball 36 is mounted within socket 38, which is positioned within knuckle body 35. Socket 38 is maintained in a neutral or center position by means of Belleville springs 42 and 44. The closed end of socket 38, which is identified by the identification numeral 39 in FIG. 3, bears upon piezoelectric crystal assembly, 46, which is housed within knuckle body 35.

In response to steering forces, socket 38 will be urged to move against the force of the Belleville springs and to thereby press upon piezoelectric crystals 46 to a greater or lesser extent. It is well known that such crystals have the ability to translate a force or pressure directly into an electrical signal. Accordingly, as roadwheel 12 is steered, the pressure upon crystals 46 will rise and fall along with the steering and as well as due to any rotational imbalance in the roadwheel and tire assembly being steered by the particular end of the tie rod to which knuckle and sensor assembly 34 is mounted. As a result, crystals 46 will generate a signal proportional to the exerted steering force. This signal is transmitted to microprocessor controller 16 by means of electrical leads 47 (FIG. 3). Boot 40 protects the internal components of knuckle and sensor assembly 34 from road contamination. Those skilled in the art will appreciate in view of this disclosure that a piezoelectric force sensor according to this invention could be employed at other points in the steering system in order to detect steering force. For example, the sensor could be mounted to either end of a steering linkage tie-rod. It will be further appreciated that other types of force sensors could be employed such as those employing strain gauges, load cells, or other types of devices.

Figure 4:
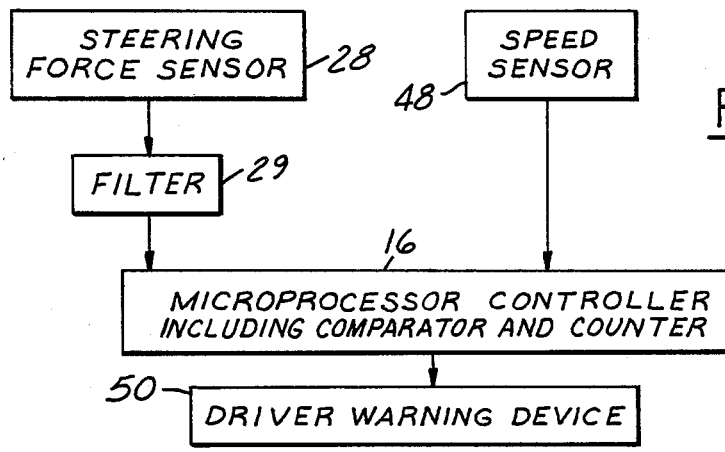
FIG. 4 is a block diagram showing component parts of a system according to the present invention.

FIG. 4 illustrates the major components of a system according to the present invention. Microprocessor controller 16 is shown as receiving inputs from steering force sensor 28, via filter 29, and speed sensor 48. Although many types of automotive speed sensors are known, one type suitable for use with a system according to the present invention comprises a signal generator driven by the powertrain of the vehicle. One such type of signal generator presently used in Ford Motor Company vehicles comprises a variable reluctance alternating current generator which produces a signal having a frequency which is directly proportional to the velocity of the vehicle. Microprocessor controller 16 is shown as sending a signal to driver warning device 50. Those skilled in the art will appreciate in view of this disclosure that microprocessor controller 16 and its associated peripheral equipment to be structured according to several known architectures. In a preferred embodiment, however, the microprocessor is configured so that control programs are sequentially read from a read-only memory (ROM). Unit commands are executed by a central processor unit (CPU). Input/Output "I/O" devices, which may be integrated with the microprocessor controller, serve to communicate with the balance of the system. One such I/O device could contain signal conditioning circuits such as filter 29. Other I/O devices could include signal frequency counters useful for rejecting spurious signals arising from road inputs. A random access memory (RAM), stores data for use by the CPU. A number of different microprocessors could be used to practice the present invention, such as the model 8096 made by the Intel Corporation or other microprocessors known to those skilled in the art and suggested by this disclosure.

Figure 5:
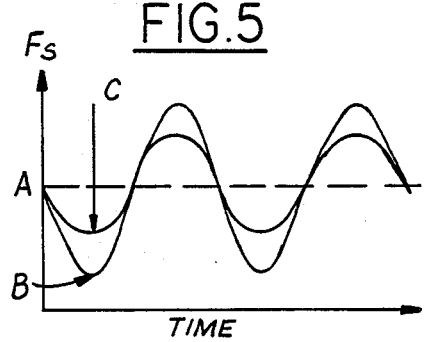
FIG. 5 is a steering force plot showing force measured by a system according to the present invention.

Microprocessor controller 16 receives raw steering force data from steering force sensor 28, which may either comprise hydraulic pressure sensor 18 shown in FIG. 1, or knuckle and force sensor assembly 34 shown in FIGS. 2 and 3, or any other suitable steering force sensor. The force signal is shown in FIG. 5 as a sinusoidal signal which alternates about the line "A". Note that the coordinates in FIG. 5 are time on the abscissa and steering force, FS on the ordinate. The magnitude of steering force corresponding to "A" of FIG. 5 represents a base component corresponding to the steering force normally required to steer the vehicle down a straight road. Note that "A" represents an invariant level of steering force, which means that the vehicle for at least the time shown in FIG. 5, is being steered straight down a roadway. Traces B and C of FIG. 5 illustrate variations in steering force attributable to dynamic rotational imbalance of the steered roadwheel. In effect, a static imbalance condition will cause a dynamic imbalance which is characterized by sinusoidal oscillatory motion of the roadwheel about its kingpin axis.

This oscillatory motion is damped by the steering mechanism; as a result, the measured steering force reflects the sinusoidal nature of the roadwheel's movement.

Trace B represents a greater magnitude of rotational imbalance than does C. Accordingly, trace B, although having the same frequency as trace C, has a greater amplitude than trace C. Both the frequency and the amplitude of the signals shown in FIG. 5 will depend upon the forward velocity of the vehicle. Accordingly, the magnitude of the dynamic rotational force imbalance, $F_I$, is given by the following transfer function:

$$F_I = f(K_1 V_{VEH}, K_2 I_S)$$

where:
$K_1$ and $K_2$ are constants relating to the particular vehicle in question;
$V_{VEH}$ is equal to the forward velocity of the vehicle; and
$I_S$ is equal to the magnitude of the static imbalance affecting the roadwheel in question.

A system according to the present invention operates as follows. While running along a roadway, force sensors 18 or alternatively, 34, dynamically measure the steering force and output a signal according to FIG. 5. This signal is conditioned by filter 29 which may comprise, for example, a bandpass filter. A bandpass filter is useful with a system according to the present invention because it is necessary to resolve the force signal into a base component corresponding to the steering force normally required to steer the vehicle and a variable component attributable to the dynamic rotational imbalance of the roadwheel under consideration. The high pass portion of a bandpass filter will eliminate the voltage offset arising from the force level shown as "A" in FIG. 5, whereas the low pass portion of a bandpass filter will eliminate undesirable high frequency signals, such as electronic noise, from a sensor system according to the present invention. If desired, the filter could be implemented in software within microprocessor controller 16 according to known techniques. The magnitude of the filtered signal may be measured by any one of a variety of means known to those skilled in the art and suggested by this disclosure. Then, microprocessor controller 16 may apply a derivation of the transfer function set forth above to calculate $I_S$. If it is desired to calculate the actual magnitude of the imbalance, the following equation may be used:

$$I_S = \frac{F_I}{K_3 V_{VEH}}$$

The equation for $I_S$ shows that the magnitude of the imbalance is a function of the measured steering force and the vehicle velocity, with constant $K_3$ operating as a correction factor for the particular vehicle in question.

Those skilled in the art will appreciate that inputs to the steering force transducers arising from imperfections in a roadway surface could give rise to a spurious imbalance signal, simply because such imperfections may tend to "kick" the roadwheels from their steered locations with a frequency emulating that of an imbalance condition. Accordingly, it is desirable for microprocessor controller 16 to eliminate such spurious signals by comparing the frequency of the velocity signal to the frequency of the variable component of the steering force. This may be done by counting the frequencies of both signals. In the event that the counted frequencies are not sufficiently alike so as to fall within a common tolerance band, the microprocessor controller will reject the steering force signal as being the spurious offspring of road inputs, rather than roadwheel imbalance. Thereafter, the system will await data which is not tainted by road inputs.

Once the magnitude of the imbalance has been calculated, microprocessor controller 16 may output a driver warning signal by means of driver warning device 50 (FIG. 4), in the event the magnitude of the imbalance exceeds a threshold value which may be a function of the velocity of the vehicle. Alternatively, the actual magnitude of the imbalance may be stored in the RAM for retrieval by a vehicle repair technician at a later date. This will allow the technician to apply the correct amount of weight in order to balance the affected roadwheels.

In the circumstance that it is not desired to calculate the precise magnitude of the imbalance, the vehicle velocity need not be employed in the calculation for $I_S$, it being necessary to compare the measured force with a predetermined threshold band having a minimum value which is sufficiently great so that a trivial imbalance will not cause the variable component of the steering force signal to exceed such minimum level at expected vehicle operating speeds, but having a maximum value which is less than the magnitude of the inputs expected from rough, deteriorated, road surfaces. In the event that magnitude of the variable component of the steering force falls outside of such threshold band, microprocessor controller 16 will reject the signal as being spurious. This technique will preferably be combined with a frequency counting technique in which variations in the frequency of the variable component of the steering force are noted, with excessive variation being used as a basis for rejecting the steering force signal. According to this technique, the frequency of the variable force component will be counted by a counter within microprocessor controller 16 over successive periods of time. If the frequency change from one period to a later period is in excess of a predetermined value, the microprocessor controller will reject the force signal as being spurious. In sum, the force signal will be rejected if either the magnitude or the frequency variation of the force signal is not within predetermined tolerances.

Various modifications and variations will no doubt occur to those skilled in the arts to which this invention pertains. All such modifications and variations which basically rely on the teachings with which this disclosure as advanced the art are properly considered within the scope of this invention as defined by the following claims.

I claim:
1. A system for detecting rotational imbalance of a steerable roadwheel of a vehicle, comprising:
   force measurement means for sensing the force required to steer said roadwheel, with said means further comprising means for generating a force signal corresponding to said sensed force; and
   processor means responsive to said force signal for determining the dynamic rotational balance condition of said roadwheel.
2. A system according to claim 1 wherein said force measurement means comprises a hydraulic pressure transducer interposed between a steering gear for steer- ing said roadwheel and a hydraulic pump for powering said steering gear.

3. A system according to claim 1 wherein said force measurement means comprises a force transducer interposed between a steering gear for steering said roadwheel and a spindle upon which said roadwheel is journaled.

4. A system according to claim 1 wherein said processor means comprises:
means for resolving said force signal into a base component corresponding to steering force normally required to steer said vehicle and a variable component attributable to dynamic rotational imbalance of said roadwheel.

5. A system according to claim 4 wherein said means for resolving said force signal comprises a bandpass filter.

6. A system according to claim 4 wherein said processor means further comprises means for comparing the magnitude of said variable force component to a predetermined threshold band as well as counter mans for determining variations in the frequency of said variable force component, so that said force signal may be rejected by said processor as a spurious signal in the event that either the magnitude or the frequency variation of said force signal is not within predetermined tolerances.

7. A system according to claim 4 wherein said processor means further comprises comparator means for comparing the magnitude of said variable component to a threshold value, with said processor means further comprising means for providing an imbalance signal in the event that said variable component exceeds said threshold value.

8. A system for measuring the rotational imbalance of a steerable roadwheel of a vehicle, comprising:
force measurement means for sensing the force required to steer said roadwheel, with said means further comprising means for generating a force signal corresponding to said sensed force;
means for measuring the forward velocity of said vehicle and for generating a signal corresponding to said velocity; and
processor means, responsive to said force signal and to said velocity signal, for determining the dynamic rotational balance condition of said roadwheel, with said processor means comprising:
means for resolving said force signal into a base component attributable to steering force normally required to steer said vehicle and a variable component attributable to dynamic rotational imbalance of said roadwheel; and
means for comparing the magnitude of said variable component to a threshold value, with said comparator means further comprising means for providing an imbalance signal in the event that said variable component exceeds said threshold value.

9. A system according to claim 8, wherein said means for resolving said force signal comprises a bandpass filter.

10. A system according to claim 8, wherein said processor means further comprises counter means for comparing the frequencies of said velocity signal and the variable component of said force signal, and means for rejecting the force signal as a spurious signal in the event that said frequencies are not within a common frequency tolerance band.

11. A method for detecting dynamic imbalance of a steered roadwheel of a vehicle, comprising:
sensing the force required to steer said roadwheel;
generating a force signal having a magnitude corresponding to said sensed force;
resolving said force signal into a base component attributable to steering force normally required to steer said vehicle and a variable component attributable to dynamic rotational imbalance of said roadwheel;
comparing the magnitude of said variable force component to a threshold value; and
providing an imbalance signal in the event that said variable force component exceeds said threshold value.

12. A method according to claim 11 further including the step of measuring the velocity of said vehicle and wherein said threshold value is determined as a function of the forward velocity of said vehicle.

* * * * *